United States Patent [19]

Meyr et al.

[11] 4,002,842
[45] Jan. 11, 1977

[54] TIME MULTIPLEX LOOP TELECOMMUNICATION SYSTEM

[75] Inventors: Heini Meyr, Hinterkappelen; Hansjurg Mey, Kehrsatz; Zdenek Nenadal, Bern; Markus Tschanz, Koniz; Eberhard W. Vogel, Bern; Emanuel Hafner, Wohlen, all of Switzerland

[73] Assignee: Hasler, AG, Bern, Switzerland

[22] Filed: Feb. 10, 1975

[21] Appl. No.: 548,604

Related U.S. Application Data

[63] Continuation-in-part of Ser. No. 376,233, July 3, 1973, abandoned.

[30] Foreign Application Priority Data

July 4, 1972 Switzerland .................. 9903/72
June 8, 1973 Switzerland .................. 8425/73

[52] U.S. Cl. ............................... 179/15 AL
[51] Int. Cl.² ............................... H04J 3/08
[58] Field of Search ............ 179/15 AL; 340/172.5

[56] References Cited
UNITED STATES PATENTS

| 3,597,549 | 8/1971 | Farmer ................... | 179/15 AL |
| 3,600,519 | 8/1971 | McNeilly ................. | 179/15 AL |
| 3,749,845 | 7/1973 | Fraser ................... | 179/15 AL |
| 3,755,786 | 4/1972 | Dixon .................... | 179/15 AL |
| 3,787,627 | 1/1974 | Abramson ................. | 179/15 BA |

*Primary Examiner*—Kathleen H. Claffy
*Assistant Examiner*—E. S. Kemeny
*Attorney, Agent, or Firm*—Brady, O'Boyle & Gates

[57] ABSTRACT

A closed unidirectional transmission loop has plural stations coupled thereto in series for transmitting time multiplexed signals in the form of addressed byte groups. For transmitting a byte group, a station delays at the end of the byte group passing on the loop the following byte groups and introduces the byte group to be transmitted into the space resulting from the introduction of the delay. As soon as a byte group that is being or has been received by its addressee arrives at the station, this station removes the delay, thereby eliminating the byte group and thereafter can send the next byte group. A monitor station in the loop provides the functions of generating a continuous byte stream circulating in the closed unidirectional transmission loop by sending filling byte groups if the loop is not fully charged during the time not occupied, synchronizing the byte stream by varying the cycle time for the loop to an entire multiple of the byte time, and eliminating mutilated byte groups that have made more than one cycle of the loop.

3 Claims, 3 Drawing Figures

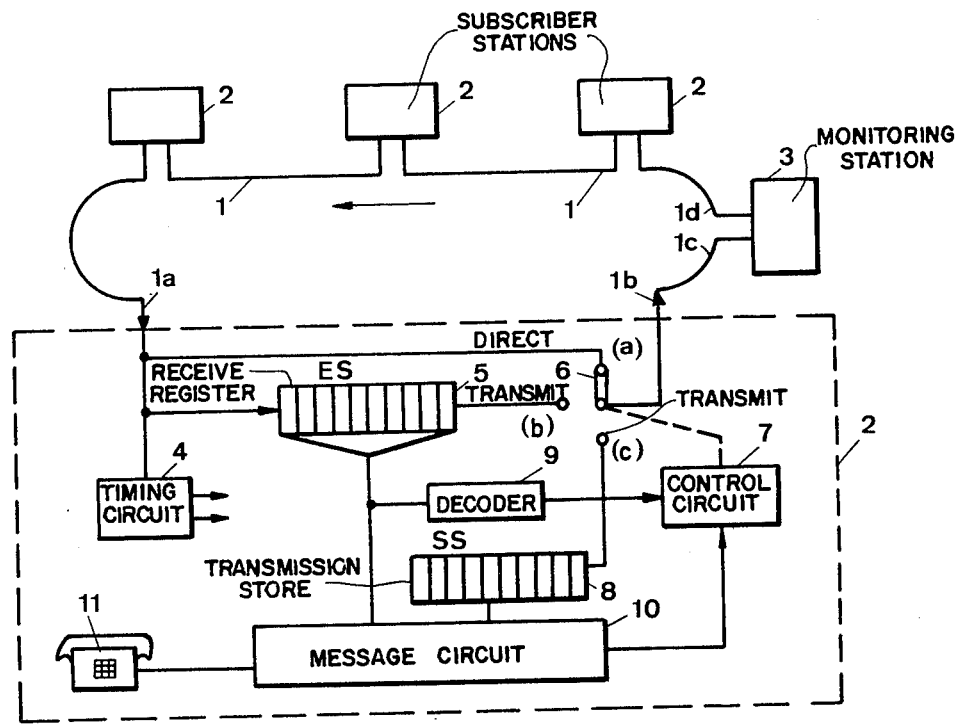
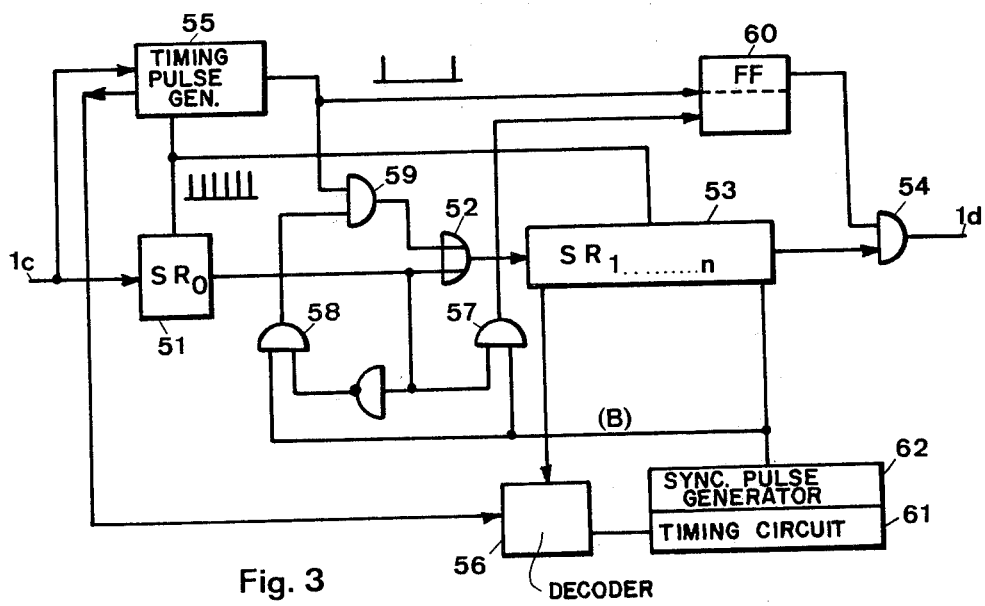

TIME MULTIPLEX LOOP TELECOMMUNICATION SYSTEM

This application is a continuation-in-part of our application Ser. No. 376,233, filed July 3, 1973, now abandoned.

FIELD OF THE INVENTION

This invention relates to a method for exchanging information without a central exchange between subscribers connected in series to a closed loop, carrying time multiplexed digital signals in one cycling direction.

DESCRIPTION OF THE PRIOR ART

The telecommunication method of the kind described has been known from U.S. Pat. No. 3,600,519, wherein a timing station determines a frame consisting of time slots, each of which is attributed to a channel. For setting up a connection between two subscribers the calling station locates an empty channel on the line and uses it for transmitting the address of the called subscriber. The called subscriber decodes the address and locks itself to this channel which is used for the transmission between the stations until the connection is cleared. During the call the channel is at the disposal only for these subscribers, even if it not be used for transmitting information all the time. It is well known in the art to attribute partial channels having a smaller capacity to connections for which this smaller capacity is sufficient. But it is not possible to match the channel capacity to the required maximum capacity and even less to the varying actual capacity. The number of possible connections has a rigid limit. When this limit is attained, no further connection can be established.

SCOPE OF THE INVENTION

It is an object of the invention to use transmission capacity only when and as far as it is required for the connection and not rigidly limit the number of simultaneous connections between subscribers, but to apportion the maximum capacity to all required connections according to their actual needs.

SUMMARY OF THE INVENTION

In accordance with the present invention all signals received from the loop are stored in each station and, in its rest position, simultaneously to the storing, forwarded from the station through the loop to the next station.

The stored signals are decoded in each station and the signals following the address assigned to the station and detected by it are received by this station; in each subscriber station, as soon as an information is ready for transmission, an address is added to the information for forming a byte group; the byte group is transmitted immediately after the end of the byte group received by the station at this moment, whereupon the station is converted to its delay position, in which the bytes received from the loop are stored and then transmitted. Each delay is equal to the time required for transmission of one byte group in the loop. In the subscriber station the rest position is re-established if no further information is ready for transmission and when a byte group destined to it or a byte group formed and transmitted by it, having made a complete cycle round the loop, is received, which byte groups are not forwarded.

In this method the byte groups may continue their way on the loop after reception and charge the loop. Their only use is then to allow the originating station to go back to its rest position.

Therefore, in a preferred method of transmission, the transmitter provides the transmitted byte group with a marker bit, the receiver inverts this bit if it forwards the byte group, and every station having transmitted a byte group and not yet returned to the rest position does not forward the next byte group having the same length as the byte group transmitted by itself and whose marker bit is inverted, and returns to the rest position.

Therein resides the principle for the attribution of the byte groups which will be referred to as telegrams because they are the bearers of the information transmitted between stations. A station can go to the rest position only by eliminating a telegram from the loop. After that, this station can transmit another telegram. Therefore more than one telegram coming from one station may be on the loop. The maximum number of these telegrams is given by the number of telegrams that arrives at the station and can be eliminated during the time the telegram takes to circulate around this loop.

In this method telegrams may not be touched during the time from transmission to reception, but after reception they are at the disposal of the receiving station or any subsequent station of being eliminated and replaced by a new telegram. This permits obtaining maximum efficiency on the transmission channels.

If traffic on the loop is below the transmission capacity of the loop one station can use the whole remaining capacity of the loop as required, if, no other station is ready to transmit a message. If only one station transmits, it uses every byte in the loop capacity cycle (i.e. at the maximum loop-byte rate). A method which requires high information rates during short times makes full use of the transmission capacities.

Because each station being in the rest position provides itself with the time necessary for transmission it can also transmit a telegram, when the traffic on the loop has attained the transmission capacity. As this limit is attained no station will receive telegrams with inverted marker bits but only those from its partner to itself. Therefore the information rate for every connection is automatically adapted to the actual traffic but is never smaller than one telegram per loop cycle time as far as the transmitter uses this rate. If the traffic is heavy and many telegrams are cycling, and if many stations are active, the cycle time may become so long, that the next telegram is ready before the telegram arrives from the partner presenting the occasion for putting the next telegram on the loop. In this case the transmission is delayed which results in a reduced maximum information rate, i.e. the number of telegrams to be transmitted during a time unit by a station is reduced but it never happens that connection cannot be established because of overload of the loop. The limit of possible connections is reached if all subscriber stations are busy.

Every connection may work with any speed up to the limit just discussed. E.g. a main clock would send a telegram every minute to the clocks controlled by it while a telephone connection requires eight thousand telegrams per second. Each connection takes for itself so much from the transmission capacity of the loop as it needs without any means for capacity attribution; therefore a single loop may serve all kinds of communications, e.g. for signal transmission, bells, call signals, standard clocks, fire alarms, and other safety networks, for the transmission of teletypewriter and data signals and for the transmission of telephony.

These above-mentioned and other features of the invention and the manner of attaining them will become more apparent and the invention itself will be best understood by reference to the following description taken in conjunction with the accompanying drawings, in which:

FIG. 1 is a diagrammatic illustration of the layout of the single loop network with a block diagram of a subscriber station;

FIG. 3 is a block diagram of a monitoring station.

Figure 2:
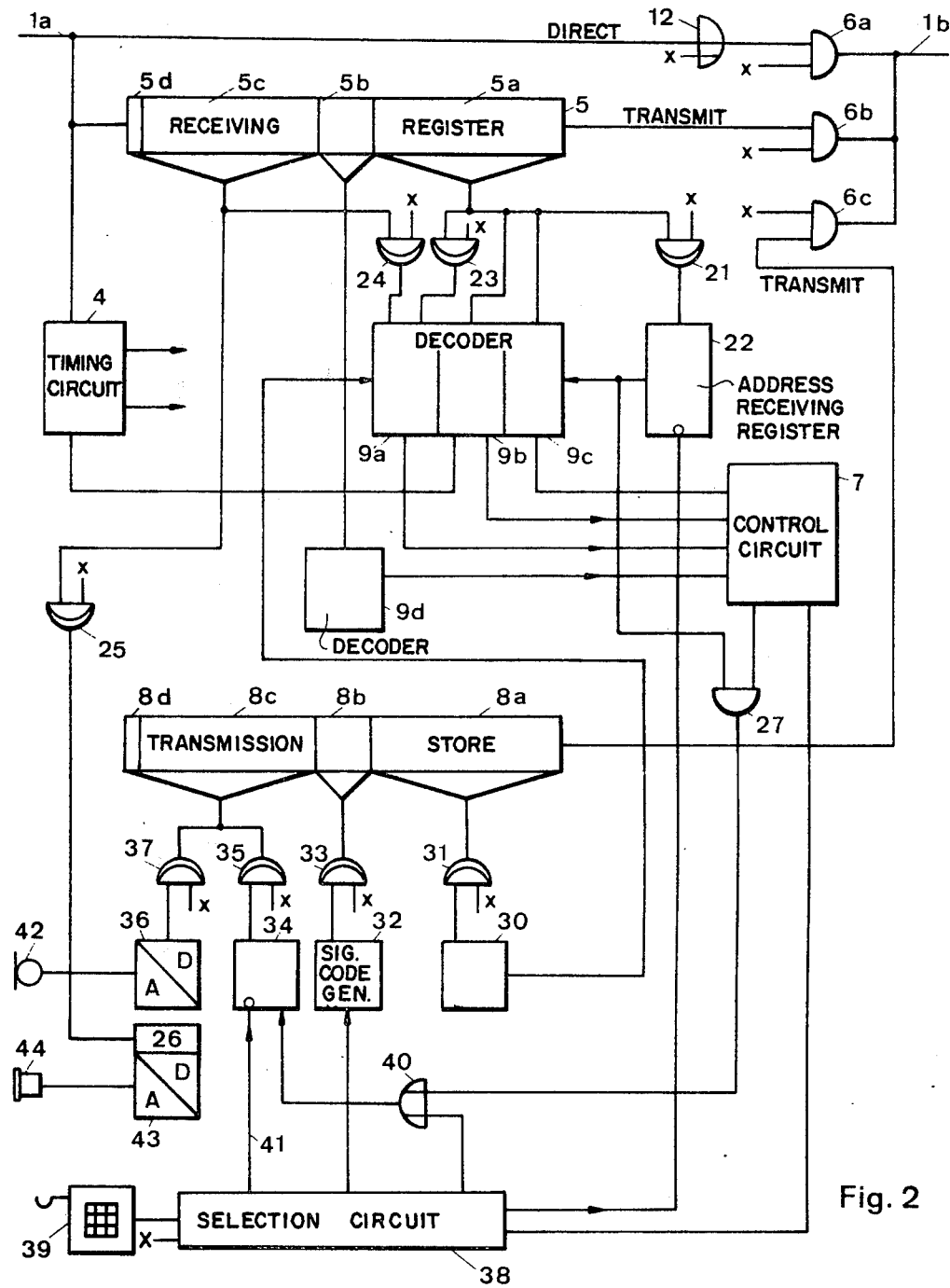
FIG. 2 is a detailed block diagram of a subscriber station.

In FIG. 1 digital signals cycle in the sense of the arrow on a loop 1. A certain number of subsequent bits form a byte. The bytes follow each other without interruption. There is no byte frame. Reference numeral 2 designates stations forming part of the loop. One of these stations, a telephone station, is shown as a block diagram.

Reference numeral 3 designates a monitoring station also forming part of the loop.

Station

In this station 1a is the receiving line or input, 1b the transmitting line or output. The input 1a is connected to a timing circuit 4, which is synchronized by the received bit stream and generates bit pulses and byte pulses for the control of the other units. Timing or clock circuit 4 may, for example, be of the same type as disclosed in FIG. 5A of U.S. Pat. No. 3,597,549 at 110 and 111. The input 1a is also connected to the input of a receiver register 5. This is a shift register into which, under control of the timing circuit, all pulses received from the line are read in and advanced in the same rhythm. Furthermore the input 1a is connected to an electronic three-position switch 6 which is controlled by control circuit 7, which control circuit is also known in the prior art from the input and output control shift registers shown at 112 and 113 of FIG. 5A of U.S. Pat. No. 3,597,549. This switch connects the output 1b in the first position (a) with the input 1a, in the second position (b) with the serial output of the receiving register 5 in the third position (c) with the output of a transmission store 8. The capacities of the receiving register 5 and the transmission store 8 are equal. The decoder 9 decodes at the end of every byte the content of the receiving register 5 and signals the reception of certain bit combinations to the control circuit 7. Receiving register 5 and transmission store 8 are further connected to a message circuit 10 which serves as intermediate circuit between the subscriber set 11 and the other circuits of the subscriber station. The circuit receives messages from the receiving register 5 and converts them into signals which can be received by the subscriber (e.g. call signals or speech amplitudes); it receives signals from the subscriber (hook, dialing, and speech signals), which it converts to messages and forwards to the transmitting store.

Reception and transmission of messages depends upon the state of the connection from the subscriber; this state is always stored in the message circuit and can be changed by a signal coming from the subscriber set 11 or from the receiving register 5. The functions of the message circuits 10, and the control circuit 7 are mutually dependent. All circuits of the station 2 designed above the transmitting store 8 work with line bit rate situated for instance between 1 and 10 megabits per second, whereas a much slower speed is sufficient for the message circuit with the exception of the transmission of messages from the receiving register 5 to the message circuit 10.

Transmission

As already mentioned an uninterrupted bit stream flows on the ring wherein a certain number of subsequent bits form a byte and the bytes follow each other without interruption. In a bit and byte synchronized network the synchronization is performed either by a separately transmitted time signal or by continuously counting the number of bits that form a byte. The start for counting is given by a synchronizing byte transmitted by a monitoring station which is also called pilot telegram; this telegram is received by all stations and synchronizes the counting operation during each cycle.

The transmission of messages between the stations is performed by means of telegrams. Each telegram consists of one byte group containing one or more entire bytes. If different lengths of telegrams are used, each telegram must contain an indication of its length. For instance, a special bit can mark the last byte of a telegram or some bits at the beginning of the telegram can indicate how many bytes it comprises.

The indication of telegram length is an example for control information which every telegram must contain. This part of the transmitted information must be kept as small as possible. Another kind of information transmitted is signalling information which serves also for the control of the stations but is rarely transmitted. Entire separate telegrams are used for this kind of information, which telegrams are referred to as signalling telegrams. Such a telegram contains signals which are equal for all stations, in opposition to the normal information telegrams which contain information individually addressed to one or more stations.

One bit is sufficient for indicating if the telegram is a signalling or an information telegram. The attribution of telegrams to the stations is made by means of address coding; each telegram contains an address. The receiver or the transmitter address can be used. In the described method the transmitter address is used.

A byte group or telegram contains at certain places the following parts:

1. an address;
2. a bit for the distinction of signal telegram from an information telegram;
3. information, e.g. signals to be transmitted (for a signalling telegram), address of the called station for a call, character information for the teleprinters, amplitude information for telephony;
4. communication concerning the length of the telegram;
5. a marking bit indicating if the telegram has already been received; and
6. a monitoring bit to be referred to later.

If the station is in the rest position, switch 6 is in position (a); the input 1a is directly connected with the output 1b.

Telegrams passing on the loop go to the next station without delay, the delays in the circuit element required for the generation of the pulses are not considered; the incoming bytes go also to the receiving register 5 and from there at the end of each byte to the decoder.

Transmission and delay position

If the station wants to transmit a telegram this is composed by the message circuit 10 and temporarily stored in the transmitting store 8. As soon as the decoder 9 under control of the timing circuit detects the end of the byte group passing in this moment the control circuit 7 switches switch 6 to the position (c) and the telegram is sent to the line 16 - 1b bit by bit. But the passing telegrams stream cannot be stopped and no byte must be lost; the bytes arriving during transmission time, when the line is interrupted, are stored in the receiving register 5. Immediately after the transmission of the last pulse of the telegram in transmitting store 8 the switch 6 is put into position (b), so that the next byte is the first byte stored in the receiving register 5 which goes to the line. By this operation the station has entered the loop, its receiving register forms part of the loop.

Clearing Return to the Rest Position

In this way not more than a telegram can be sent. Before another one can follow, the station must return to the rest position. For doing so a telegram must be eliminated from the loop. It must be known that the elimination by the respective stations is allowed. These telegrams are normally telegrams with an inverted marker bit or that are to be received by the station. These telegrams have the same length as the receiving register. As soon as such a telegram has been stored in the receiving register, the decoder either detects the inverted marker bit or the address. Now the control circuit 7 commutates switch 6 into position (c). This eliminates the telegram from the loop and the next one follows immediately to the preceeding one. Now the station has left the loop and is in the rest position, its receiving register serves only as receiver. The telegram which has been retained is automatically cleared by coming out of the receiving register.

It is also possible to transfer the outgoing messages in the instant before the beginning of the transmission directly from the message circuit to the receiving register 5 and to read them out from this register; in this case switch 6 has only 2 positions.

Reception

In the rest position of the station the receiving register 5 continues to operate and receives all telegrams passing on the line since it is permanently connected to the input 1a of the station. Now it serves only to receive information for the decoder 9 and in some cases for the message circuit 10. The decoder 9 examines every telegram whether it is addressed to the own station. If this is the case, it sends a signal to the control circuit 7, which inverts the marker bit (see description of FIG. 2). The decision for the inversion must be made before the whole telegram is in the receiving register 5 because the marker bit enters the register simultaneously with its transmission to the next station. The decoder and the connections between the receiving register and decoder must be arranged accordingly. By the inversion of the marker bit the telegram is marked as received. This passive reception does not change the length of the loop; only the marker bit is inverted which makes the telegram available for the following stations. This passive reception corresponds to a liberation of traffic capacity in the loop. In the active state, when the telegrams are transmitted from the receiving register the station does not invert the marker bit but uses the received telegram for returning to the rest position.

Detailed description of a subscriber station

FIG. 2 is a detailed block diagram of a telephone subscriber station. Corresponding units bear the same numbers as in FIG. 1. Their description is not repeated if FIG. 2 does not show more details of them than FIG. 1.

The switch 6 consists of three And-gates 6a, 6b, and 6c, one of which is always enabled. These gates as well as other gates to be described later are under control of the control circuit 7. The control connections are not shown in the Figure and are replaced by crosses at the gate input.

When the receiving register 5 has just been filled with a byte group corresponding to its length, which fact is given by the byte pulses emitted by timing circuit 4 and by the pulses delivered by a signal decoder 9c, the content of the different parts of the receiving register 5 is the following: Contents of part 5a: address, 5b: signalling, 5c: information, 5d: marker bit. The contents of these register parts can be transferred by means of gate groups 21, 23, 24, 25. The number of gates of each gate group is equal to the number of bits on the corresponding register part. In the drawings, multiple gates are distinguished from single gates by a double semicircle on the gate symbols. The gates of the group transfer these bits simultaneously when they are enabled by a pulse coming from the control circuit. The content of the address part can be transferred via the gate group 21 to the address receiving register 22 or via gate group 23 to the decoder 9a, while it is currently decoded by the decoder 9b and 9c. The signal part from 5b goes to decoder 9d and the information part either via gate group 24 to decoder 9a or via gate group 25 to the information store 26.

The decoder 9a delivers an output signal if it receives at its input the address of the own station; decoder 9b delivers one signal if in the receiving register there is a synchronizing telegram and another one if there is a telegram which enables the station to go back to the rest position. Decoder 9c gives an output signal as it receives the address stored in the address receiving register 22.

The OR-gate 12 is inserted in the connection between input 1a and gate 6a. The bit passing on the line can be changed from zero to one by a pulse given from the control circuit to gate 12.

The transmitting store 8 contains the same parts as the receiving register, i.e. a part 8a for the own address, part 8b for signalization, part 8c for the information, and part 8d for the marker bit which is initially always on zero. These parts are filled before a telegram is transmitted. Part 8a obtains its contents from the generator circuit of the own address via gate group 31, part 8b from signal code generator 32 via gate group 33 and part 8c from the address transmitting register 34 via gate group 35 or from the analog to digital converter 36 via gate group 37. Signal code generator 32 is of the same type as generators 168 to 171 in FIG. 5B of U.S. Pat. No. 3,597,549 for the signal codes SOM, WF, OP and EOM.

The selection circuit 38, which may be of the type as shown at 27 and 32 in FIG. 2 of U.S. Pat. No. 3,600,519, receives on one hand signals from the hook switch and the selection keyboard on the telephone set 39, possibly also from other press buttons on this apparatus, on the other hand from the control circuit 7. The selection circuit stores the different states of the station when the call is set up; depending on the actual state and the received signals the state is changed or the signals are transmitted to the own telephone station. Different kinds of signalling telegrams are used, for instance call telegrams, ready telegrams (station idle); response telegrams (off-hook after ringing); terminating telegrams (on hook after call).

When the hand set of telephone set 39 is lifted and the number is selected the selection circuit composes the call telegram. Its information part contains the address of the called subscriber, derived in a simple fashion from the selected call number. This address is transmitted via the gate group 40 to the address transmission register 34 and remains there stored until the end of the call, when it is cleared by a signal via conductor 41. Simultaneously with the recording of the information the signal code generator 32 delivers the signal code for a call telegram, the address code generator 30 adds, as in every telegram, the own address and the telegram is transmitted as already described.

The receiver, if it is idle, detects in the information part its own address and records immediately the address of the calling subscriber into its address receiving register 22. This enables it to get any telegram coming from the calling subscriber and containing the address of this subscriber. Furthermore it transfers the address of the calling subscriber from the address receiving register 22 via the gate groups 27 and 40 to the address sending register 34.

The called subscriber answers by an "idle" telegram composed by its own address and a signal code "idle". The selection circuit releases the bell and causes the transmission of an answer telegram as soon as the receiver is lifted. Now the connection is established.

The information is exchanged by means of information telegrams which contain as information one coded speech amplitude, the marking as information telegram and, as always, the address of the originating station. The conversion of the voltages delivered by microphone 42 into digital values is performed by the analog to digital converter 36, the reverse conversion by the digital to analog converter 43 for the telephone 44. Every 125 ms. an information telegram is composed, but can be omitted if no speech information is to be transmitted, because the subscriber does not speak which is recognized by the fact that either the voltage delivered by the microphone is zero or did not change since the last telegram. Coding can be performed according to any of the known methods (PCM, Data modulation and so on). Thereby the occupation of the loop corresponds automatically to the required transmission capacity.

For other kinds of information transmission, e.g. for teletypewriters or data transmission, the selection of the called subscriber is performed in the same manner; the transmission of telegrams is effected with the rate required by the transmission method without changing whatsoever at the transmission equipment.

If the station has only to receive signals but not to transmit them the equipment may be much simplified because all parts used for telegram transmission can be omitted. Among the parts not required is the switch 6 and the transmitting register 8; the output of gate 12 is directly connected to the output on the station 1b. Even more parts can be omitted if this station has to receive only telegrams coming from a certain partner because in this case the address receiving register 22 is not required and the address of the partner can be stored once and forever in the decoder 9c. Of course as many of such stations that receive only can be connected to the ring without charging its capacity. Such receivers may be: alarm bells or other signalling devices, electrical clocks, control switches, loudspeakers, etc.

The message circuit may be adapted without considerable change of the station for setting up multi-address connections for simultaneous transmission of information from one station to any number of receiving stations. In order to do this the transmitting station transmits a number of telegrams with the effect that the address of the transmitting stations is recorded in the address receiving registers of the receiving stations. At the same time they receive the order to act only as receivers. All telegrams containing the transmitter address are received by all called receiving stations. If a telegram is received which goes also to further stations the marker bit must not be changed by a receiving station.

Monitoring station

The monitoring station 3 is connected to the loop. This station does not act as exchange: It does not contain any information concerning the stations and is completely independent of their number and their transmission speed. It has no input or output apart from the ring besides perhaps an alarm output. There are at least three functions of the monitoring station:

First: it generates bit pulses and byte pulses for the loop by sending pilot telegrams and, if the loop is not fully charged, filling telegrams during the time not occupied by subscriber telegrams. Pilot telegrams and filling telegrams do not contain an address of a subscriber.

Second: because the loop is closed and the telegrams do not start or terminate at a main station and because the pulse stream on the loop must be synchronous as far as bits and bytes are concerned, the cycle time for the complete loop must be exactly equal to an entire multiple of the byte time. The cycle time on the loop without monitoring station may vary by reason of temperature on the line or of varying delays in the subscriber stations and the regenerators. Therefore the monitoring station acts as variable delay, so that the cycle time including the monitoring station is equal to the byte time or an entire multiple of it.

Third: It may happen that the telegram is mutilated by a disturbance and recognized neither by the transmitter nor by the receiver. If it were not eliminated it would continue to circle around the loop and obstruct it together with other mutilated telegrams. For this reason every transmitted telegram is provided with a special bit, the so-called monitoring bit which initially is equal to 0 and is inverted to 1 when going through the monitoring station. If a telegram arrives at this station, whose monitoring bit is equal to 1, this telegram has made more than one cycle and is eliminated.

FIG. 3 shows a block diagram of the monitoring station 3 connected to the loop according to FIG. 1. 1c is its input, 1d its output. On the way from the input to the output a stage 51 of a shift register SR, and OR-gate 52, further stages 53 of the shift register SR and an AND-gate 54 are disposed. The timing pulse generator 55, which is similar to timing circuit 4 of FIGS. 1 and 2, delivers bit pulses to shift register 51 and byte group pulses to flip-flop 60 and is bit synchronized by the bit pulses received from the loop 1 via input 1c of the monitoring station 3, and byte synchronized by signals obtained from the decoder 56. The decoder receives signals from the shift register 53 and is controlled by the timing pulses coming from the timing generator 55, which enquires on every byte, if the byte actually in the shift register 51, 53 is a synchronizing byte. If this is the case, it is forwarded without being changed, otherwise a signal appears on the line marked by (B) enabling the gates 57 and 58. At the same time the monitoring bit appears at the other input of gate 57 and inverted at the other input of gate 58. If it is equal to zero, the signal appears at the output of gate 58 and passes gate 59 enabled in this moment or the OR-gate 52 to the shift register 53, and is therefore inserted into the telegram as a one.

If the monitoring bit is equal to one, it indicates a telegram having made more than one cycle. A signal appears at the output of gate 57 and changes the state of flip-flop 60 which causes the output gate 54 to be blocked during one byte, thereby eliminating the faulty telegram and causing a not reproduced circuit to transmit a telegram containing a request for return to the rest position and not containing a specified address.

If a telegram has been eliminated in the way described, the originating station must return to rest position, which it cannot do because it is waiting for the return of the transmitted telegram or for an answer of its partner or for a telegram with an inverted marker bit. It must return to the rest position as fast as possible. An indication for the loss of a transmitted telegram consists in the fact that the pilot telegram has passed twice and not the expected telegram. If this is the case, the station prepares itself for executing the order to go back to the rest position. This is sent by the monitoring station as already described and received by the respective station and is eliminated in the normal way. From thereon everything continues as normal.

If during a predetermined time no synchronizing byte arrives at the monitoring station, timing circuit 61 detects it and triggers the synchronizing pulse generator 62 to insert a synchronizing byte at this appropriate place. Timing circuit 61 is a retriggerable monostable multivibrator with clear type SN74123 manufactured by Texas Instruments, Inc. and listed on page 6–79 in their "The Integrated Circuits Catalog For Design Engineers", First Edition (1971) and synchronizing pulse generator 62 is of the type shown in U.S. Pat. No. 3,597,549 in FIG. 5A at 197.

The terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

We claim:
1. In combination
 a closed unidirectional transmission loop (1)
 plural stations (2) for transmitting information signals and signalling codes in form of addressed telegrams or byte groups each provided with an address and having the same number bytes, among such stations and having each an input (1a) and an output (1b), the input of each station being connected to the output of another of said stations by a section of said loop;
 each said station (2) being operable in a first, a second and a third mode of operation respectively, said first mode of operation corresponding to the idle state of the station;
 means (3) generating a continuous byte stream circulating in said transmission loop (1);
 each said station (2) comprising
 a subscriber set (11);
 a message circuit (10) connected to said subscriber set (11) and including first storing means for storing at least one address and means for forming addressed byte groups by adding one of the stored addresses to every information which is ready for transmission in the station;
 second storing means (5) having a serial input connected to the input (1a) of the station (2), a parallel output connected to said message circuit (10) and a serial output, and storing for a byte group period the bytes appearing at its input providing a delay equal to the time required for transmission of one byte group to the loop;
 switching means (6) connecting in said first mode of operation the input (1a) of the station (2) to the output (1b) thereof, connecting in said second mode of operation the serial output of said second storing means (5) to the output (1b) of the station (2) thus connecting the delay in circuit with the loop, and transmitting in said third mode of operation one of said addressed byte groups to the output (1b) of the station (2);
 detecting means (9) delivering first control signals at the end of every byte group appearing at the input of the station and delivering a second control signal when detecting at the input of the station a byte group addressed to the station, and a third control signal when detecting at the input of the station one of said addressed byte groups formed and transmitted by the station itself;
 control means (7) connected to be actuated by said message circuit (10) and said detecting means (9) and connected for switching said switching means (6) from said first to said third mode of operation connecting the delay into the loop for inserting the byte group ready for transmission into the space resulting from the introduction of the delay when receiving a first control signal from said detecting means (9) after one of said addressed byte groups has been formed in said message circuit (10), and switching said switching means (6) from said third to said second mode of operation after one of said addressed byte groups have been transmitted to the output (1b) of the station (2), and responsive on said second and third control signals respectively for switching said switching means (6) from said second to said first mode of operation if no further addressed byte group is formed in said message circuit (10), and from said second to said third mode of operation if a further addressed byte group is formed in said circuit means (10).

2. In combination
 a closed unidirectional transmission loop (1);
 a plurality of stations (2) each having an input (1a) and an output (1b);
 a monitoring station (3) having an input (1c) and an output (1d);
 each of said inputs (1c, 1a) of said stations (3, 2) being connected by a section of said closed loop (1) to the output of another of said stations (3, 2);

said monitoring station (3) generating a continuous byte stream circulating in said closed loop unidirectional transmission line (1);

each station (2) comprising a timing circuit (4) connected to the input (1a) of the station and synchronized by the signals on the loop (1) and delivering bit pulses and byte pulses in synchronism with the loop signals;

a register (5) having a serial input connected to the input (1a) of the station (2), a serial output, and a parallel output, and having a delay equal to the time required for transmission of one byte group to the loop;

a transmission store (8) having an input and a serial output;

switching means (6) having a first (a), a second (b) and a third position (c) and connecting the output (1b) of the station (2) in the first position (a) to the input (1a) of the station, in the second position (b) to the serial output of the register (5) and in the third position (c) to the serial output of the transmission store (8) thus connecting the delay in circuit with the loop in the second and third positions;

a decoder (9) having an input connected to the parallel output of the register (5), and an output delivering a first control signal at the end of every byte group appearing at the input (1a) of the station, one of second control signals when detecting in the register (5) a byte group addressed to the station;

a subscriber set (11);

a message circuit (10) connected to said subscriber set (11) and having a parallel input connected to the parallel output of the register (5), a first output connected to the input of the transmission store (8) and a second output, said message circuit (10) adding an address to each information received from said subscriber set (11), thereby composing a byte group, and thereafter delivering a further control signal on its second output; and a control circuit (7) having a first input connected to the output of the decoder (9), a second input connected to the second output of the message circuit (10), said control circuit (7) switching said switching means (6)

to said third position when in said first position it receives a first and a further control signal, to said second position when in said third position it receives the first control signal, to said first position when in said second position it receives the first control signal and one of said second control signals, but no further control signal, to said third position when in said second position it receives the first control signal, one of the second control signals and the further control signal.

3. The combination in accordance with claim 1, in which in at least one of said stations said transmission store (8) includes a part (8d) for adding a marker bit to every byte group stored therein;

and in at least one other station a gate (12) coupled to the loop (1) and controlled by said detecting means (9) and being operative to invert said marker bit in response to one of said second control signals;

said detecting means (9) delivering a fourth control signal when detecting an inverted marker bit in said second storing means (5);

said control means (7) being responsive to said fourth control signal for switching said switching means (6) to said first mode of operation, if no further addressed byte group is formed in said message circuit (10), and from said second to said third mode of operation if a further addressed byte group is formed in said circuit means (10).

* * * * *